United States Patent [19]
Lang et al.

[11] 4,291,608
[45] Sep. 29, 1981

[54] EXPANSION DOWEL

[75] Inventors: Gusztav Lang, Munich; Friedrich Storck, Hersbruck; Hans-Dieter Seghezzi, Vaduz, all of Fed. Rep. of Germany

[73] Assignee: Hilti Aktiengesellschaft, Fürstentum, Liechtenstein

[21] Appl. No.: 973,029

[22] Filed: Dec. 26, 1978

[30] Foreign Application Priority Data

Dec. 28, 1977 [DE] Fed. Rep. of Germany ...... 2758374

[51] Int. Cl.³ .......................................... F16B 13/06
[52] U.S. Cl. ...................................... 411/16; 411/18; 411/78
[58] Field of Search ............... 85/64, 63, 79, 77, 74, 85/73, 87, 86, 75; 405/259; 151/14.5

[56] References Cited
U.S. PATENT DOCUMENTS

| 3,277,770 | 10/1966 | McCulloch | 85/67 |
| 3,302,509 | 2/1967 | Modrey | 85/64 |
| 3,308,585 | 3/1967 | Fischer | 85/63 X |
| 3,851,559 | 12/1974 | Baude | 85/87 X |
| 3,951,034 | 4/1976 | Chromy | 85/79 |
| 4,094,222 | 6/1978 | Lang et al. | 85/63 |
| 4,098,166 | 7/1978 | Lang | 85/63 |

FOREIGN PATENT DOCUMENTS 549789 10/1956 Italy .......................................... 85/64

Primary Examiner—Ramon S. Britts
Attorney, Agent, or Firm—Toren, McGeady & Stanger

[57] ABSTRACT

An expansion dowel consists of an axially extending dowel body with a spreading member at its leading end and an expansion member extending around the dowel body rearwardly of the spreading member. A helically arranged control cam surface is formed on the expansion member and faces toward the trailing end of the dowel body. A stop is formed on and extends outwardly from the dowel body and contacts the control cam surface. When the dowel body is turned around its axis relative to the expansion member, the stop rides on the control cam surface and causes the spreading member to expand the expansion member radially outwardly.

4 Claims, 9 Drawing Figures

EXPANSION DOWEL

SUMMARY OF THE INVENTION

The present invention is directed to an expansion dowel including an elongated cylindrical dowel body having a frustoconically shaped spreading member at its leading end with the spreading member tapering inwardly toward the trailing end of the dowel body. An expansion member laterally encloses the dowel body rearwardly of the spreading member and is radially expanded when the spreading member is forced inwardly into the leading end of the expansion member.

In known expansion dowels of the above type, the complete dowel assembly is inserted into a borehole which has a corresponding diameter. Subsequently, by withdrawing the dowel body from the borehole its spreading cone is pulled into the expansion member, usually by means of a screw and nut arrangement, and the expansion member is radially expanded into gripping contact with the surface of the borehole. When the expanding action is effected, the dowel body is withdrawn from the borehole to a lesser or greater amount. In the known expansion dowels there is the disadvantage that the finally placed dowel bodies project to a varying degree out of the borehole in the surface of a receiving material. Moreover, the expanding procedure using a thread of a relatively low pitch is very time-consuming.

Therefore, the primary object of the present invention is to provide a simple expansion dowel which can be set in place with little difficulty.

In accordance with the present invention the expansion member has a helically extending control cam surface extending at least partially around the circumference of the dowel body with the cam surface facing toward the trailing end of the dowel body. A stop member is secured to and extends outwardly from the dowel body into contact with the control cam surface. Due to the interaction of the control cam surface and the stop member, when the dowel body is turned around its longitudinal axis, an axial shift is effected between the expansion member and the spreading member. During this axial shift, the expansion member is slid forwardly onto the spreading member and is radially expanded. The dowel body, however, is not shifted within the borehole until the expansion member is spread radially into contact with the surface of the borehole. With the expansion member spread and radially fixed in the borehole, any further turning of the dowel body causes it to project outwardly from the borehole. As a rule, since all dowels must be prespread to the same extent, practically all dowels project from the borehole by the same amount after the spreading procedure is completed. The shape of the control cam surface can be adjusted to the particular requirements of each situation. For example, the control cam surface may have a steep inclination or pitch at the portion initially contacted by the stop member so that a small angular rotation of the dowel body relative to the expansion member results in a large axial displacement of the expansion member and, as a result, a considerable spreading of the expansion member. Following the portion of the control cam surface having a steep inclination, the inclination may decrease so that the application of a relatively small amount of torque will lead to a significant spreading of the expansion member in the borehole.

For a particularly simple arrangement of the expansion dowel assembly, it it advantageous if the expansion member is in the form of a sleeve. Such a sleeve can be produced, for example, by a punching procedure from a flat piece of sheet metal which can subsequently be placed around the dowel body. Production of the expansion member from a tubular section is also possible. The expansion member can be formed from a single piece or it may be assembled from a plurality of axially extending parts held together in a sleeve-like section.

Another advantageous embodiment involves the formation of the expansion memeber as a helically extending strip. Such a helix may consist, for example, of a strip of sheet metal wound helically about the dowel body. This arrangement has the additional advantage that a helically formed expansion member can be arranged so that it has a spring action and is axially pretensioned before the commencement of the expanding procedure.

In still another advantageous embodiment one end of the expansion member is formed as a plural-part sleeve-like member with a helically arranged strip extending from its trailing end around the dowel body. Accordingly, the two functions of the expansion member, that is the generation of an axially acting force component and expansion in cooperation with the spreading member, are each performed by a separate element. As a result of this functional separation between the different parts of an expansion member, it is possible to utilize the materials which are best suited for the particular purpose. If necessary, the sleeve-like members can be exchanged and adjusted in accordance with the specific conditions or properties of the receiving material into which the expansion dowel assembly is inserted.

When certain receiving materials are involved, such as, gas concrete or similar light-weight construction materials and, when the location of expansion is close to an edge, the permissible expansion forces are considerably limited. In such cases, so-called adhesion anchors have been used in the past. These adhesion anchors, however, have the disadvantage that a load can be applied only after the anchor has been set and a certain curing time has elapsed. To provide an anchor suitable for use in such situations, it is advantageous to use the expansion dowel of the present invention with the turns of the helically shaped expansion member spaced apart and containing the components of a two-component adhesive with the components each contained in a separate destructable sheathing. When the expansion dowel is being prespread, the spaces between adjacent turns of the helical expansion member become smaler and the sheathings enclosing the adhesive components are destroyed. With the sheathings broken open, the adhesive components mix and result in a hardening mixture adhering to the wall of the borehole on one hand and to the dowel body on the other hand. Accordingly, after curing or hardening, a form-locking connection secures the expansion dowel within the borehole.

To prevent rotation of the expansion member together with the dowel body, when the dowel body is turned or rotated for prespreading the dowel, it is advantageous if the expansion member includes a means on its periphery for holding it against rotation. Such a means, for example, can be provided by bending one of the free ends of the expansion member outwardly. As a result, the outwardly bent end engages the wall of the borehole and counteracts any tendency of the expansion member to rotate along with the dowel body. Another possibility for securing the expansion member against rotation involves roughening the outer surface of the expansion member.

In principle, the function of the expansion dowel in the present invention is ensured by providing a stop member on the circumferential surface of the dowel body. To afford uniform distribution of the generated axially extending forces over the expansion member and to prevent clamping of the expansion member, however, it is advantageous if a pair of diametrically opposed stop members are formed on the dowel body with each in contacting engagement with a different control cam surface. The axial foreces required for prespreading the expansion member are distributed by this arrangement of plural control cam surfaces and, as a result, lower pressures occur at the points of contact between the stop members and the control cam surfaces and any erosion or surface destruction is prevented.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figures 1, 2:
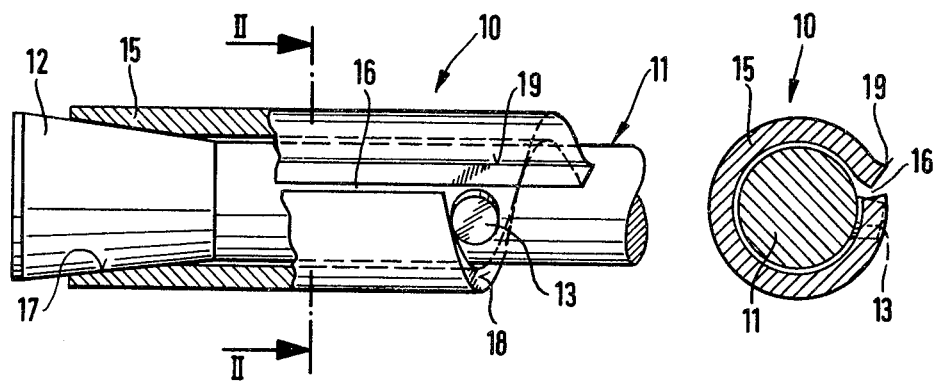
FIG. 1 is a side view, partly in section, of an expansion dowel embodying the present invention with the expansion member in the form of a sleeve.
FIG. 2 is a sectional view taken along the line II—II in FIG. 1.

In FIGS. 1 and 2 an expansion dowel 10 is illustrated and consists of an axially elongated dowel body 11 with an expansion member in the form of a sleeve 15 laterally enclosing a portion of the axial length of the dowel body. The dowel body has a leading end, shown at the left end in FIG. 1 and a trailing end, not shown, that is, the leading end is the end first inserted into a borehole. At its leading end, the dowel body has a frusto-conically shaped member 12 with a decreasing diameter in the direction extending from the leading end toward the trailing end. On the dowel body 11, spaced from the spreading member 12 toward the trailing end, is a stop member 13 which projects outwardly from the circumferential surface of the dowel body. The sleeve 15 has an axially extending slot 16 extending for the entire length of the sleeve. Due to the slot 16, the sleeve 15 can be radially expanded. The interior surface of the sleeve 15 adjacent the spreading member 12 has a frustconically shaped surface 17 complementary to the circumferential surface of the spreading member 12. At its trailing end, the sleeve has a control cam surface 18 extending helically around the circumference of the dowel body 11 and facing toward the trailing end of the dowel body. Initially, before the expanding action takes place, the stop 13 contacts the portion of the control cam surface 18 which is closer to the leading end of the dowel body. By turning the dowel body 11 about its longitudinal axis relative to the sleeve 15, due to the action of the stop member 13 riding over the control cam surface 18, the sleeve is forced axially forwardly toward the spreading member 12. Because of the movement of the sleeve 15 relative to the spreading member 12, when the expansion dowel assembly is placed in a borehole, the radially expanding action on the sleeve 15 causes it to be locked in the borehole. As can be seen in FIG. 2 which illustrates a sectional view through the expansion dowel of FIG. 1, the sleeve 15 surrounds the dowel body 11 about its entire circumference. One end 19 of the sleeve is bent outwardly and serves to secure the sleeve against rotation. When the expansion dowel assembly is placed in a borehole, the outwardly bent end 19 contacts the surface of the borehole and prevents, during prespreading of the dowel, any rotation of the sleeve 15 along with the rotation of the dowel body 11. On the other hand, the transverse dimension of the stop member 13, that is, its dimension projecting outwardly from the dowel body, is such that is does not project outwardly beyond the outside diameter of the sleeve 15.

Figures 3, 4:
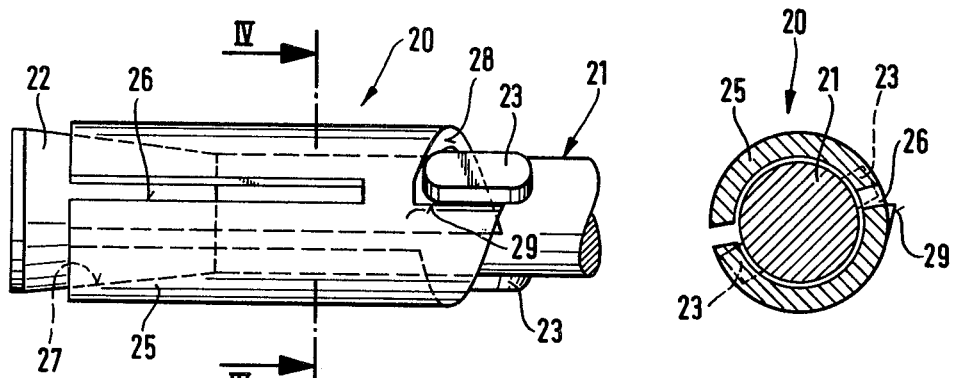
FIG. 3 is a side view, similiar to FIG. 1, of another embodiment of an expansion dowel incorporating the present invention with a sleeve-like expansion member.
FIG. 4 is a sectional view taken along the line IV—IV in FIG. 3.

In FIG. 3 another expansion dowel 20 is shown embodying the present invention. Expansion dowel 20 consists of a dowel body 21 with a spreading member 22 at its leading end and an expansion member in the form of a sleeve 25 extending around the dowel body. To facilitate its spreadability, the sleeve 25 is provided with axially extending slots 26. The spreading member 22 is frusto-conically shaped and the sleeve has a similar frusto-conically shaped surface 27 at its end adjacent the spreading member. The trailing end of the sleeve 25 has a helically arranged control cam surface 28. The control cam surface 28, however, is divided into two sections each extending about half of the circumference of the dowel body. Each section of the control cam surface 28 contacts a separate stop member or cam 23, the two cams 23 extend outwardly from the dowel body 21. When the dowel body is turned around its longitudinal axis within the sleeve, the cams 23 each ride along one of the sections of the control cam surface 18 causing the sleeve to be displaced in the axial direction toward the spreading member 22 with the sleeve or expansion member being spread radially.

In the sectional view of the expansion dowel 20 shown in FIG. 3, the two cams 23 are shown extending outwardly from the dowel body 21 with the cams being arranged diametrically opposite one another. The sleeve 25 surrounds the dowel body about its entire circumference. The rearward end 29 of the sleeve is bent outwardly for securing the sleeve against rotation. When the expansion dowel 20 is placed in a borehole, if the dowel body 21 is turned about its longitudinal axis, the outwardly bent end 29 prevents the rotation of the sleeve with the dowel body.

Figure 5:
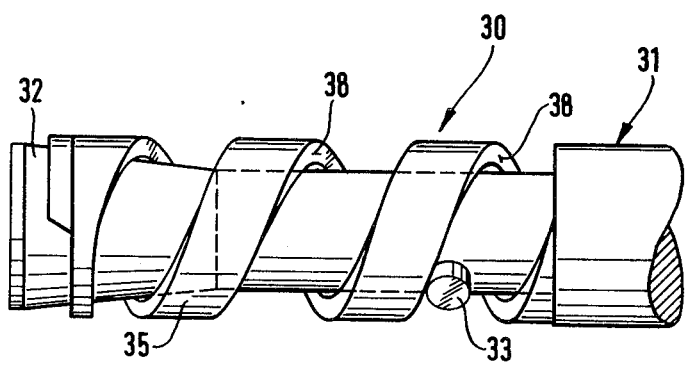
FIG. 5 is a side view illustrating still another embodiment of the present invention with the expansion member formed as a helically extending strip.

In FIG. 5 an expansion dowel 30 is illustrated providing another embodiment of the present invention. The expansion dowel 30 consists of an axially elongated dowel body 31 with a frusto-conically shaped spreading member 32 at its leading end, and an expansion member 35. Toward the trailing end of the dowel body, a cylindrically shaped stop member 33 extends outwardly from the body. Expansion member 35 is in the form of a helically extending strip which is wound about the dowel body 31. The rearwardly facing edge of the expansion member or helix 35 provides a helically extending control cam surface 38. When the dowel body 31 is turned around its longitudinal axis, its stop member 33 rides over the control cam surface 38 and displaces the helix 35 toward the spreading member 32. As a result of the movement of the helix 35 relative to the spreading member 32, it is expanded radially.

Figure 6:
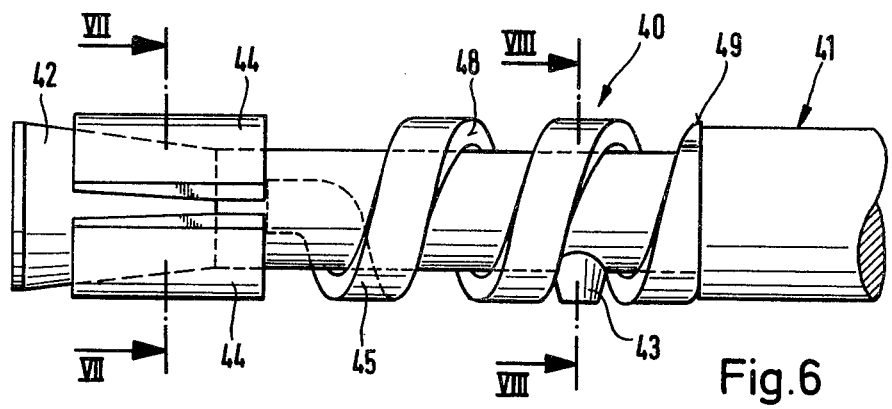
FIG. 6 is a side view of yet another embodiment of the present invention with the expansion member formed of different parts.

In FIG. 6 another expansion dowel 40 embodying the present invention is illustrated. The expansion dowel 40 consists of a dowel body 41 with a frusto-conically shaped spreading member 42 on its leading end and the spreading member has a shape similar to that in FIG. 1. A stop member 43 is formed on and extends radially outwardly from the dowel body 41. Laterally enclosing an axial portion of the spreading member 41, is plural-part sleeve-like section 44 with the plural-parts being axially coextensive. A helically shaped strip 45 is secured to the trailing end of the sleeve-like section 44 and extends around the dowel body 41 toward its trailing end. The rearwardly facing edge of the helically shaped strip 45 forms a helically extending control cam surface 48. The stop member 43 is in contact with the control cam surface 48. When the dowel body 41 is turned around its longitudinal axis relative to the sleeve-like section 44 and the helically shaped strip 45, the stop member rides over the control cam surface 48 and causes an axial displacement of the helically shaped strip 45 toward the spreading member 42 so that the sleeve-like section 44 is spread radially outwardly.

Figure 7:
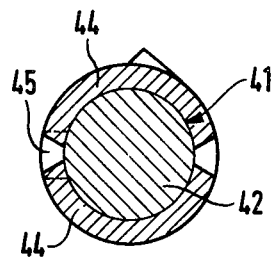
FIG. 7 is a sectional view taken along the line VII—VII in FIG. 6.

In FIG. 7 a sectional view is displayed through the expansion dowel 40 along the line VII—VII of FIG. 6. The individual plural-parts of the sleeve-like section 44 are shown located on opposite sides of and enclosing the dowel body 41. The plural-parts of the sleeve-like section 44 can be secured on the dowel body 41 by means of an adhesive tape or a wire extending around the parts.

Figure 8:
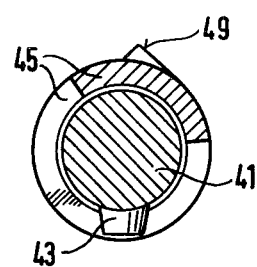
FIG. 8 is a sectional view taken along the line VIII—VIII in FIG. 6.

In FIG. 8 a section through the dowel 40 is illustrated taken along the line VIII—VIII of FIG. 6. In this Figure the helically shaped strip 45 is shown encircling the dowel body 41. Stop member 43 has a radially extending dimension such that it does not project beyond the outside diameter of the strip 45. Further, the trailing end 49 of the helically strip 45 is bent outwardly for securing the expansion member against rotation. The outwardly bent end 49 prevents rotation of the helix when the dowel body is turned around its longitudinal axis.

Figure 9:
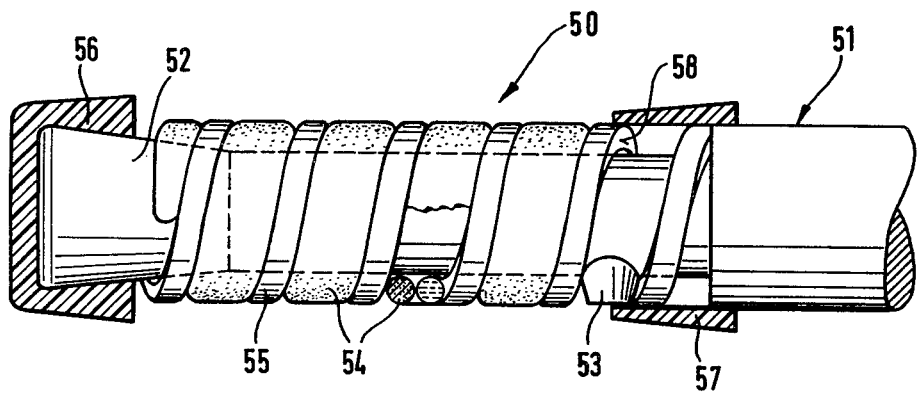
FIG. 9 is a side view of a further embodiment of the present invention incorporation a two-component adhesive with the expansion member.

In FIG. 9 another expansion dowel 50 is shown embodying the present invention. Expansion dowel 50 includes a dowel body 51 with a frusto-conically shaped spreading member 52 at its leading end. A stop member 53 is positioned on and extends outwardly from the dowel body 51 at a location spaced axially rearwardly from the spreading member 52. A helically shaped strip 55 extends around the dowel body from a rearward portion of the spreading member 52 toward the trailing end of the dowel body. The turns of the helically shaped strip are spaced apart and the components of a two-component adhesive 54 is located between each pair of adjacent turns. Each component of the adhesive 54 is enclosed within a destructible sheathing or tube. A sealing cap 56 is positioned on the front end of the spreading member 52 and a sealing sleeve 57 extends laterally around the dowel body 51 and the helically shaped strip 55. The rearwardly facing edge of the helically shaped member 55 forms a control cam surface 58. When the dowel body 51 is turned around its longitudinal axis, the stop member 53 rides over the control cam surface 58 causing an axial displacement of the helically shaped strip 55 in the direction of the spreading member 52. As a result of the pressure developed by the axial displacement acting on the destructible sheathing enclosing the two-component adhesive 54, the sheathings rupture and the two components, resin and hardener or setting agent, combine into a hardenable mixture. The broken portion of the sheathings act as a filler material. When the leading end of the helically shaped strip 55 is displaced axially along the spreading member 52, its leading end is radially expanded and locked within the borehole. In addition to the mechanical anchoring of the expansion dowel by the spreading action of the helically shaped strip 55, a further holding action is afforded by the adhesive components after they have hardened.

While specific embodiments of the invention have been shown and described in detail to illustrate the application of the inventive principles, it will be understood that the invention may be embodied otherwise without departing from such principles.

What is claimed is:

1. Expansion dowel to be inserted into a borehole or the like with the dowel having a leading end which is first inserted into a borehole and a trailing end, comprising an axially elongated dowel body having a leading end and a trailing end, said dowel body including an axially extending spreading member located at the leading end thereof and said spreading member having a dimension in the direction transverse to the axial direction which decreases in the direction from the leading end toward the trailing end, an expansion member extending laterally around said dowel body from said spreading member toward the trailing end thereof, said expansion member being radially expandable when said separating member is pulled axially through said expansion member, wherein the improvement comprises that said expansion member has a control cam surface extending helically around at least an angular portion of the circumference of said dowel body and said control cam surface faces toward the trailing end of said dowel body, a stop formed on and extending outwardly from the circumferential surface of said dowel body spaced axially from said spreading member, said stop disposed in contact with said control cam surface and said dowel body being turnable about its axis so that said stop rides along said control cam surface and provides relative movement between said spreading member and said expansion member pulling said spreading member onto said expansion member and causing said expansion member to expand radially outwardly, said expansion member comprises a plural-part sleeve-like section extending from said spreading member toward the trailing end of said dowel body, and a helically extending strip wound about said dowel body and extending from the end of said sleeve-like section which is more remote from said spreading member toward the trailing end of said dowel body.

2. Expansion dowel, as set forth in claim 1, wherein said expansion member includes means for holding said plural-part sleeve-like section together around said dowel body.

3. Expansion dowel, as set forth in claim 1, wherein said control cam surface is formed on an edge of said strip which faces toward the trailing end of said dowel body.

4. Expansion dowel, as set forth in claim 1, wherein the adjacent turns of said helically extending strip are spaced apart, separate destructible tubular sheaths each containing a different component of a two-component adhesive located in the spaces between adjacent turns of said helically extending strip and extending helically around said dowel body so that relative axial movement of said dowel body and said helically extending strip causes said sheaths to rupture permitting the components to mix and harden.

* * * * *